(12) United States Patent
Devos et al.

(10) Patent No.: US 11,476,593 B2
(45) Date of Patent: Oct. 18, 2022

(54) ELECTRICAL CONNECTION BETWEEN A FIRST CONDUCTOR AND A SECOND CONDUCTOR

(71) Applicant: Tyco Electronics Belgium EC BVBA, Oostkamp (BE)

(72) Inventors: Peter Devos, Beernem (BE); Henk Maes, Oostakker (BE)

(73) Assignee: Tyco Electronics Belgium EC BVBA, Oostkamp (BE)

( * ) Notice: Subject to any disclaimer, the term of this patent is extended or adjusted under 35 U.S.C. 154(b) by 411 days.

(21) Appl. No.: 16/407,653

(22) Filed: May 9, 2019

(65) Prior Publication Data

US 2019/0348771 A1 Nov. 14, 2019

(30) Foreign Application Priority Data

May 9, 2018 (EP) ..................................... 18171607

(51) Int. Cl.
*H01R 4/02* (2006.01)
*H01M 50/502* (2021.01)
(Continued)

(52) U.S. Cl.
CPC .......... *H01R 4/029* (2013.01); *H01M 50/502* (2021.01); *H01M 50/528* (2021.01); *H01M 50/571* (2021.01)

(58) Field of Classification Search
CPC .......... H01R 4/02; H01R 4/029; H01R 4/028; H01R 4/70; H01R 4/625; H01R 2101/00;
(Continued)

(56) References Cited

U.S. PATENT DOCUMENTS

| 2014/0308561 | A1 | 10/2014 | Bayerische et al. |
| 2015/0037642 | A1* | 2/2015 | Pinon ................ H01M 10/4257 429/99 |
| 2015/0140409 | A1* | 5/2015 | Sakurai ............... H01M 50/543 429/159 |

FOREIGN PATENT DOCUMENTS

| DE | 1072674 B | 1/1960 |
| DE | 1665266 | 1/1971 |

(Continued)

OTHER PUBLICATIONS

Britannica, The Editors of Encyclopaedia. "Aluminum". Encyclopedia Britannica, Oct. 23, 2020, https://www.britannica.com/science/aluminum. Accessed May 24, 2021. (Year: 2020).*

(Continued)

*Primary Examiner* — Maria Laios
*Assistant Examiner* — Adam J Francis
(74) *Attorney, Agent, or Firm* — Barley Snyder

(57) ABSTRACT

An electrical connection comprises a first conductor and a second conductor electrically connected to the first conductor. The first conductor has a first contact section with a first contact face laterally delimited by a first side face. The second conductor has a second contact section with a second contact face surrounded by a rim having a second side face. The second side face limits a contact space above the second contact face and the first contact face is arranged on the second contact face. A reservoir space is arranged between the first side face of the first contact face and the second side face of the rim, the reservoir space surrounds the first contact face and a sealing material is arranged in the reservoir space. The sealing material forms a sealing ring that seals an interface between the first contact face and the second contact face.

16 Claims, 5 Drawing Sheets

(51) Int. Cl.
*H01M 50/528* (2021.01)
*H01M 50/571* (2021.01)

(58) Field of Classification Search
CPC .. H01R 2101/26; H01R 43/005; H01R 43/02; H01R 43/0207; H01R 43/0221; H01R 13/5216; H01M 50/528; H01M 50/502; H01M 50/571
See application file for complete search history.

(56) References Cited

FOREIGN PATENT DOCUMENTS

| | | | | |
|---|---|---|---|---|
| DE | 1665266 A1 | * | 1/1971 | ............... C25B 9/65 |
| DE | 1665266 B2 | * | 4/1975 | ............... C25B 9/65 |
| DE | 102011087038 A1 | | 5/2013 | |
| EP | 2913895 A1 | | 9/2015 | |
| JP | 2007066766 A | * | 3/2007 | ............. Y02E 60/50 |

OTHER PUBLICATIONS

English Translation of JP 2007066766 A, Electrolyte membrane-electrode assembly, 2007, Nissan Motor (Year: 2007).*
Extended European Search Report, Appl. No. 18171607.7, dated Oct. 22, 2018, 9 pages.

* cited by examiner

ELECTRICAL CONNECTION BETWEEN A FIRST CONDUCTOR AND A SECOND CONDUCTOR

CROSS-REFERENCE TO RELATED APPLICATION

This application claims the benefit of the filing date under 35 U.S.C. § 119(a)-(d) of European Patent Application No. 18171607.7, filed on May 9, 2018.

FIELD OF THE INVENTION

The present invention relates to an electrical connection and, more particularly, to an electrical connection between a first conductor and a second conductor.

BACKGROUND

A first conductor and a second conductor are commonly connected by a welding layer. The welding layer, however, does not provide long-term stability of an electrical connection between the first conductor and the second conductor.

SUMMARY

An electrical connection comprises a first conductor and a second conductor electrically connected to the first conductor. The first conductor has a first contact section with a first contact face laterally delimited by a first side face. The second conductor has a second contact section with a second contact face surrounded by a rim having a second side face. The second side face limits a contact space above the second contact face and the first contact face is arranged on the second contact face. A reservoir space is arranged between the first side face of the first contact face and the second side face of the rim, the reservoir space surrounds the first contact face and a sealing material is arranged in the reservoir space. The sealing material forms a sealing ring that seals an interface between the first contact face and the second contact face.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
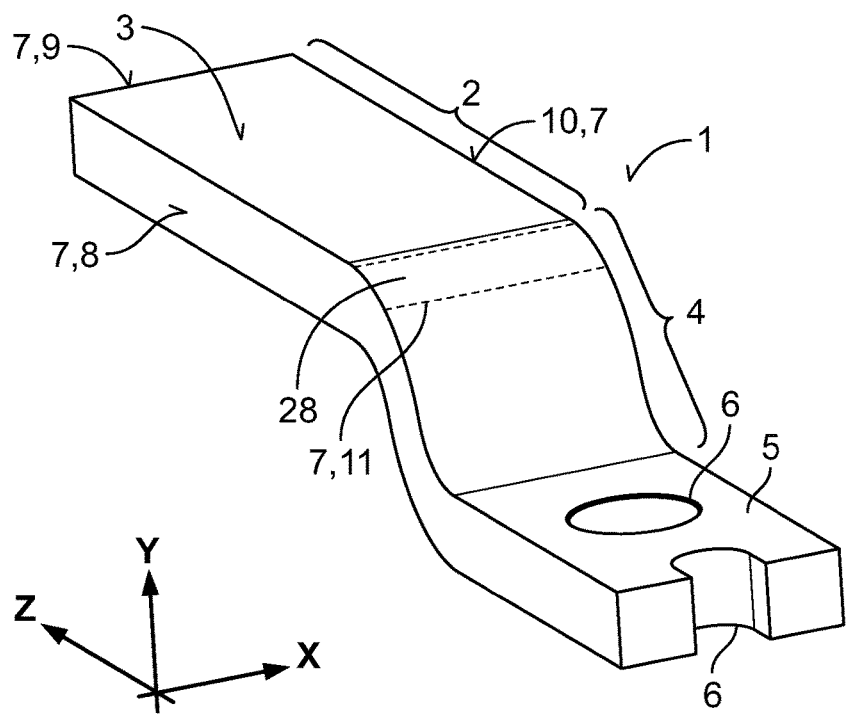
FIG. 1 is a perspective view of a first conductor according to an embodiment.

Embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the disclosure will convey the concept of the invention to those skilled in the art.

A first conductor 1 according to an embodiment is shown in a Cartesian coordinate system with three axes X-Y-Z in FIG. 1. In the shown embodiment, the first conductor 1 is embodied as a bus bar. In other embodiments, the first connector 1 can also have other shapes, for example, the shape of a plate or a stripe. In an embodiment, the first conductor 1 is a metal stripe with a bent section.

The first conductor 1, as shown in FIG. 1, has a first contact section 2 with a first contact face 3 disposed at an end. The first contact section 2 is connected via a bent section 4 with a first conductor section 5. The first conductor section 5 has a plurality of holes 6 in the shown embodiment. The first contact face 3 is limited by a first side face 7. The first side face 7 surrounds the first contact face 3. The first contact face 3 is embodied as a plane smooth face. The first side face 7 laterally delimits the first contact face 3. The first side face 7 includes three lateral faces 8, 9, 10 of the first conductor 1.

A fourth section of the first side face 7, as shown in FIG. 1, is provided by a surface 11 of the bent section 4. The surface 11 is curved and extends from the first contact face 3. The surface 11 is monolithically formed in a single piece with the first contact face 3. The fourth section of the first side face 7 is provided by a stripe 28 of the surface 11 of the bent section 4; the stripe 28 is depicted by two parallel dotted lines. The stripe 28 is arranged in parallel to the second lateral face 9.

In another embodiment, the first contact face 3 may be confined instead by the surface 11 of the bent section 4 by a side surface which is formed in the first contact section 2. In such an embodiment, the first contact face 3 may be limited by four lateral side faces of the first conductor 1.

In an embodiment, the first conductor 1 is made of a metal part, for example, cut from a metal plate and bent to the depicted shape. In other embodiments, the first conductor section 5 may also have another shape or another length than shown. Furthermore, depending on the embodiment, the first contact face 3 may not have a rectangular shape as shown in FIG. 1 but may have also different shapes, for example the shape of a circular area or any other shape. Any metal material may be used for producing the first conductor 1, for example copper can be used. The first conductor 1 may be made of a stripe of copper.

The first contact face 3 is arranged in a Z-X-plane as shown in FIG. 1. The first, second and third lateral face 8, 9, 10 are arranged perpendicular to the first contact face 3. However, in other embodiments, the first, second and third lateral faces 8, 9, 10 may also be arranged with other angles different from 90° with respect to the first contact face 3. The first conductor section 5 is arranged in a Z-X-plane parallel to the first contact section 2. The surface 11 of the bent section 4 has a curved S-shape and is in the shown embodiment arranged perpendicular to a Z-Y-plane. In an embodiment, a width of the stripe shape of the first conductor 1 along an x-axis may be in the range of 15 mm. In an embodiment, a thickness of the first conductor section 5 along the Y-axis may, for example, be in a range of 2.5 mm or more.

Figure 2:
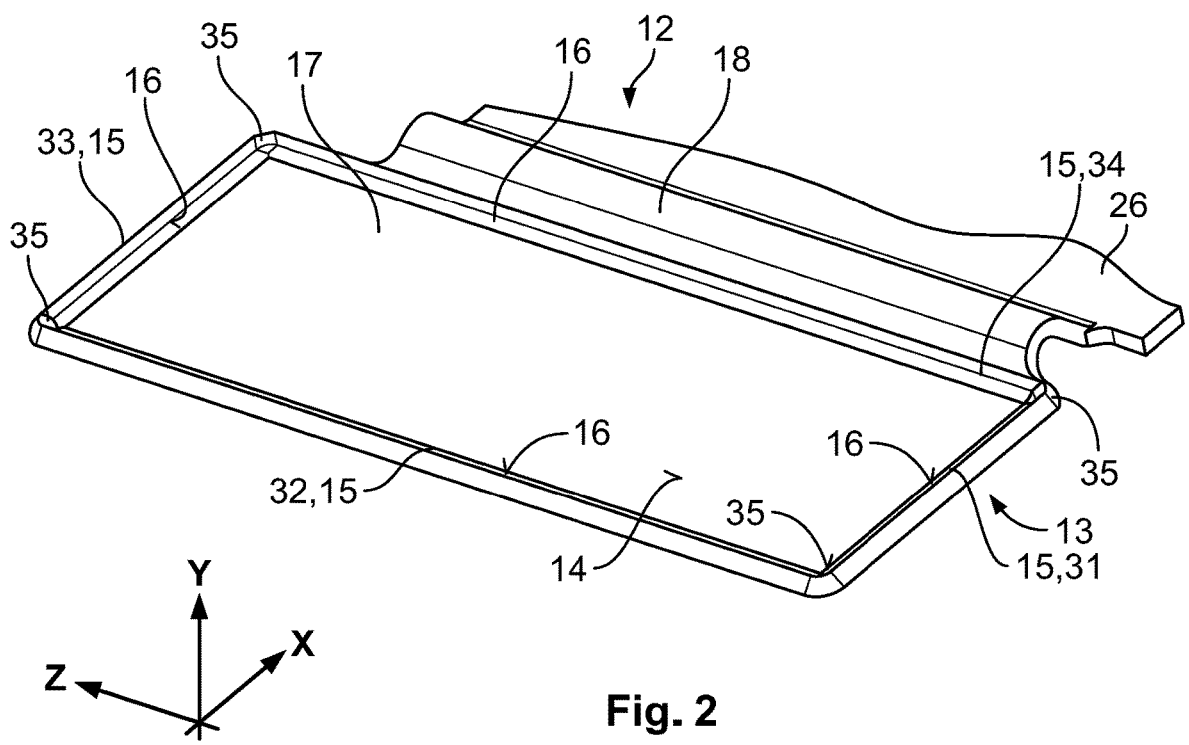
FIG. 2 is a perspective view of a second conductor according to an embodiment.
Figure 3:
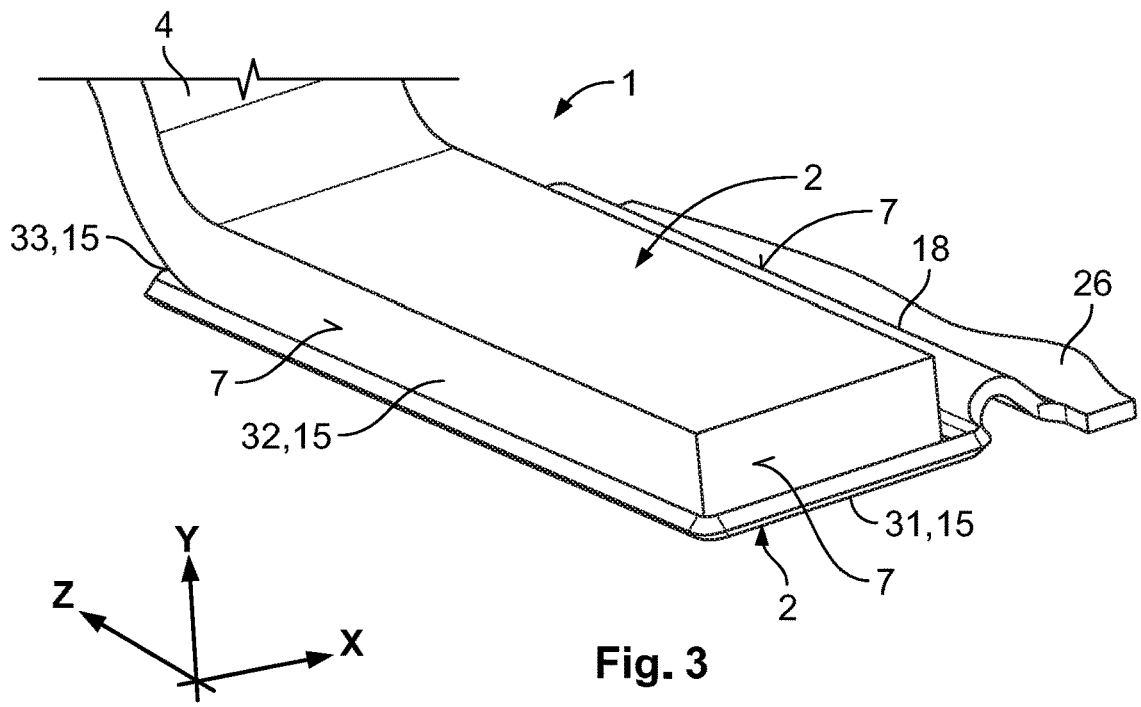
FIG. 3 is a top perspective view of an electrical connection between the first conductor and the second conductor.
Figure 4:
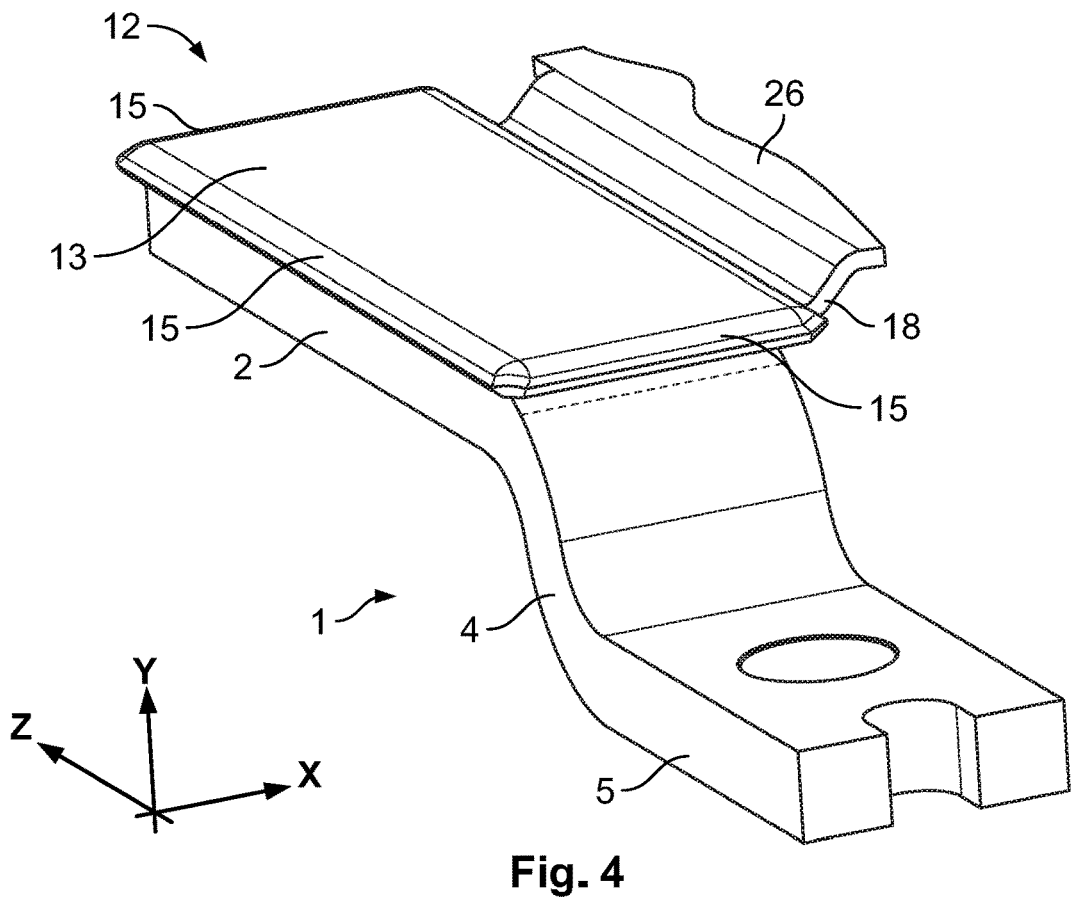
FIG. 4 is a bottom perspective view of the electrical connection between the first conductor and the second conductor.

A second conductor 12 according to an embodiment is shown in a Cartesian coordinate system in FIG. 2. The second conductor 12 has a second contact section 13 with a second contact face 14. The second contact face 14 is arranged in a Z-X-plane. The second contact face 14 is surrounded by a rim 15. The rim 15 has an inner circumferential second side face 16 which limits a contact space 17 above the second contact face 14. The second side face 16 is arranged with an angle of 90° with respect to the second contact face 14. In other embodiments, the second side face 16 may also be arranged with an angle different from 90° with respect to the second contact face 14.

The second contact face 14, as shown in FIG. 2, is embodied as a plane and smooth face. The second contact face 14 has in the shown embodiment the shape of a rectangular area. In other embodiments, the second contact face 14 may have a different shape, for example a circular area.

In the embodiment shown in FIG. 2, the rim 15 is surrounded by four rim parts 31, 32, 33, 34 that are connected via rim corners 35 of the second contact face 14. At a fourth rim part 34 of the rim 15 a second bent section 18 connects to a second conductor section 26 of the second conductor 12. The second conductor section 26 is only partially shown. The second conductor section 26 may be arranged on the same height and in the same plane as the second contact face 14. An upper surface of the second bent section 18 at least partially forms a part of the fourth part 34 of the rim 15.

In an embodiment, the second conductor 12 may be formed from a plate or a stripe. The second conductor 12 may be made of metal, for example, made of aluminum. The contact space 17 may be formed by a stamping process or by any other process which produces a second contact face 14 which is laterally limited by a circumferential second side face 16. The second conductor 12 with the second contact section 13, the second bent section 18, and the second conductor section 26 may be formed by folding or bending the second bent section 18 from a plate.

In an embodiment, the second conductor 12 may have a thickness along the y-axis in the range of 0.8 to 1.2 mm. In an embodiment, the rim 15 may have a height with respect to the second contact face 14 along the Y-axis of about 1 mm.

FIGS. 3-7 shows a first process position in which the first contact face 3 of the first contact section 2 of first conductor 1 is arranged on the second contact face 14 within the contact space 17. The shape of the first contact face 3 is smaller than the shape of the second contact face 14. The first contact face 3 and the second contact face 14 are plane and even surfaces and lie on each other and are in contact with each other at an interface.

In an embodiment, there may only be a small lateral distance between the first side face 7 of the first contact face 3 and the second side face 16 of the rim 15. The rim 15 positions the first contact face 3 within the second contact face 14. The lateral distance may be smaller than 1 mm, and may be in the range of one tenth of a millimeter. This surrounding space forms a reservoir space for filling in sealing material, as described in greater detail below.

The first contact face 3 can be electrically and mechanically connected with the second contact face 14 by a welding process forming a welding layer as an interface between the first and second contact faces 3, 14. The welding layer can reduce the electrical resistance and increase mechanical fixing between the first contact face 3 and the second contact face 14. In an embodiment, an ultrasonic welding process may be used to generate a planar connection layer as a welding layer between the first and second contact faces 3, 14. In other embodiments, other welding processes or electrically and mechanically connecting processes and layers may be used. In an embodiment, a laser welding process can be used to connect the first and the second contact faces 3, 14 in a planar area.

Figure 5:
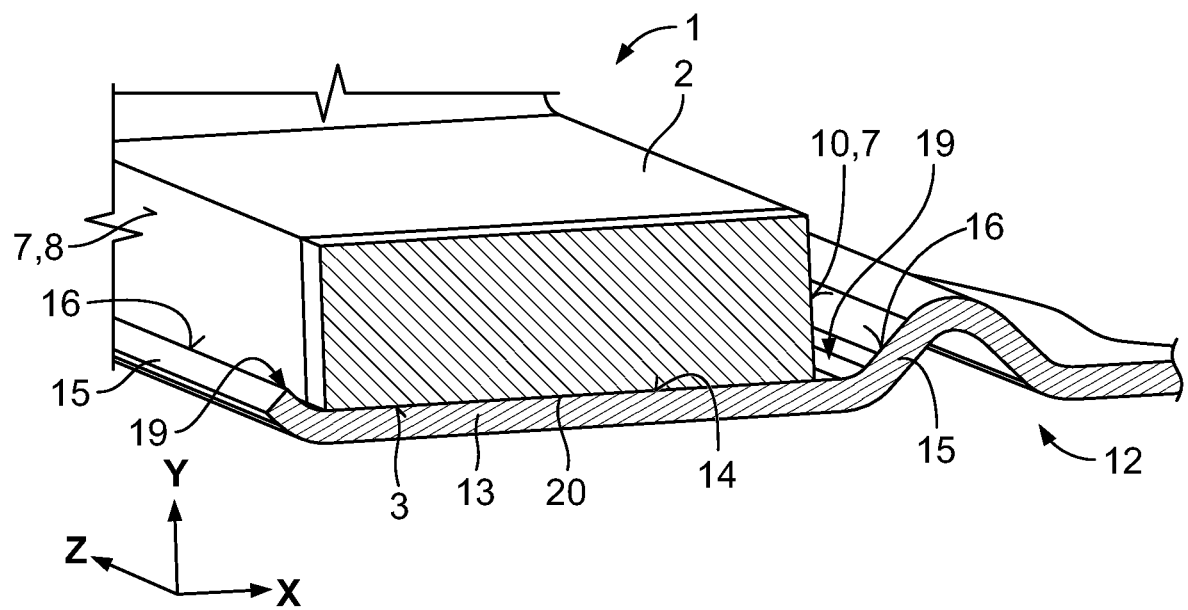
FIG. 5 is a sectional end view of the electrical connection of FIG. 3.

Between the third lateral face 10 of the first side face 7 of the first contact face 3 and the second side face 16 of the rim 15, a reservoir space 19 is provided, as shown in FIG. 5. Also at the opposite side, between the first lateral face 8 of the first side face 7 and the second side face 16 of the rim 15, a reservoir space 19 is provided. The reservoir space 19 surrounds the first contact section 2. Additionally, between the first contact face 3 and the second contact face 14, the welding layer 20 is arranged as an interface.

Figure 6:
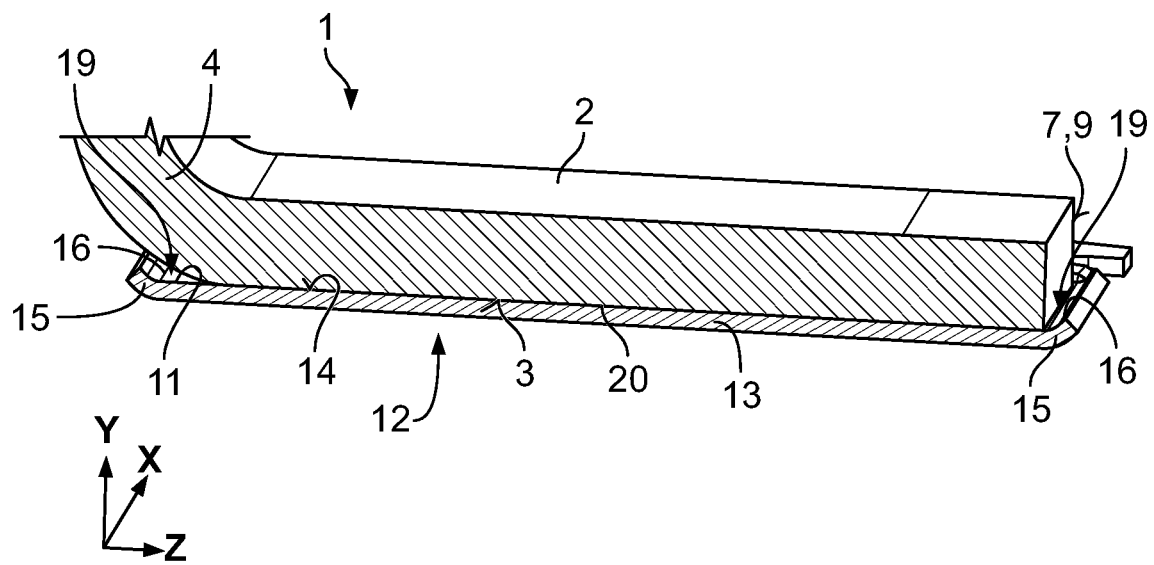
FIG. 6 is a sectional side view of the electrical connection of FIG. 3.

Between the second lateral face 9 of the first side face 7 and the second side face 16 of the rim 15, as shown in FIG. 6, a reservoir space 19 is provided. Also between the surface 11 of the bent section 4 and the second side face 16 of the rim 15, a reservoir space 19 is provided.

As shown in FIGS. 5 and 6, the rim 15 may also be formed by bent rim areas of the second conductor 12. Furthermore, as described above, the contact space 17 may also be stamped in the surface of the second conductor 12. A combination of forming and bending processes may be used to form the second contact face 14 with the second side face 16.

Figure 7:
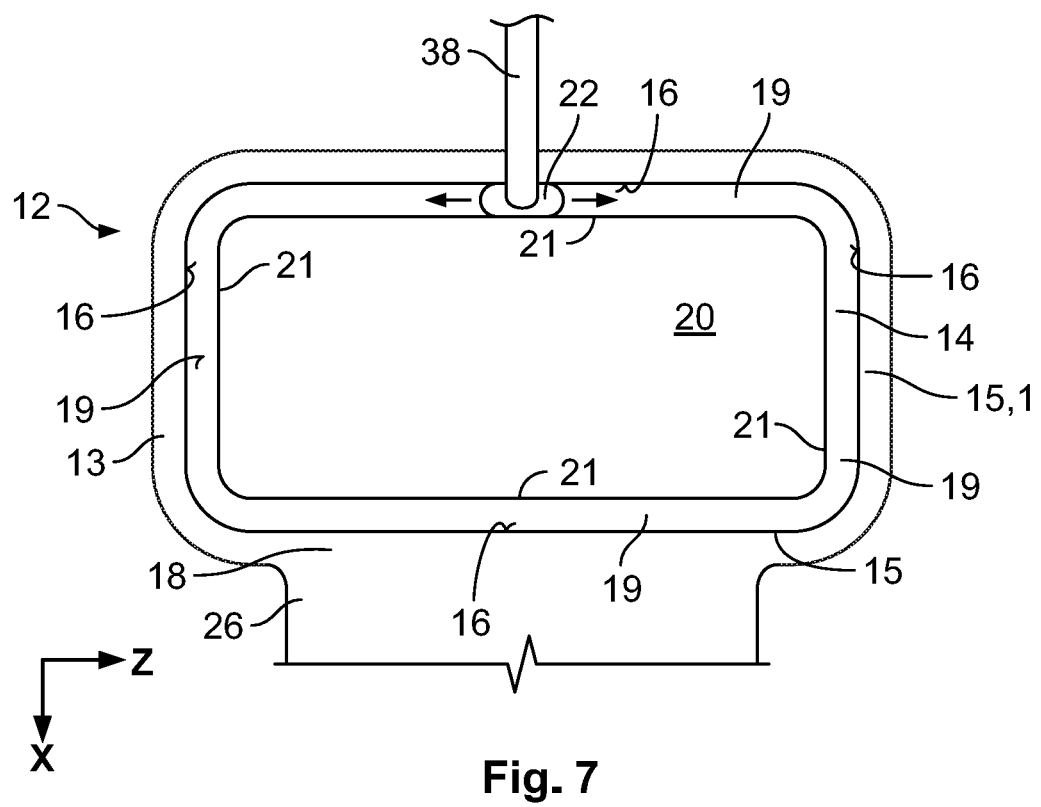
FIG. 7 is a top view of the electrical connection of FIG. 3.

FIG. 7 shows the interface 20 between the first contact face 3 and the second contact face 14. The interface 20 may be embodied as the welding layer 20. The reservoir space 19 surrounds the interface 20 and a sealing material can now be filled in the reservoir space 19. The sealing material may be soft and pasty and be filled in the reservoir space 19 with applicable methods. The sealing materials may be, for example, acrylics, polyurethanes, epoxy resins, or silicones.

In an embodiment, the sealing material may be a fluid sealing material 22 that can be filled in or dosed in the reservoir space 19 by a nozzle 38. In an embodiment, the sealing material is filled in at one position or at several positions in the reservoir space 19. The fluid sealing material 22 then flows around the reservoir space 19, filling up a ring gap 21 adjacent to the interface 20. After forming a fluid ring, the sealing material 22 is cured to a tight sealing ring protecting the interface 20.

In an embodiment, the first contact section 2 extends above the contact space 17. Therefore, it is not necessary to provide a deep recess in the second conductor 12 or to form a high rim 15 for the contact space 17, and less sealing material 22 is sufficient to fill the reservoir space 19. The sealing ring has a height which is smaller than a height of the first side face 7. In an embodiment, the sealing ring has a height smaller than 50% of the height of the first side face 7. In another embodiment, the sealing ring may not fill up the whole height of the reservoir space 19; the sealing ring may have a height smaller than 80% of the reservoir space 19.

Figure 8:
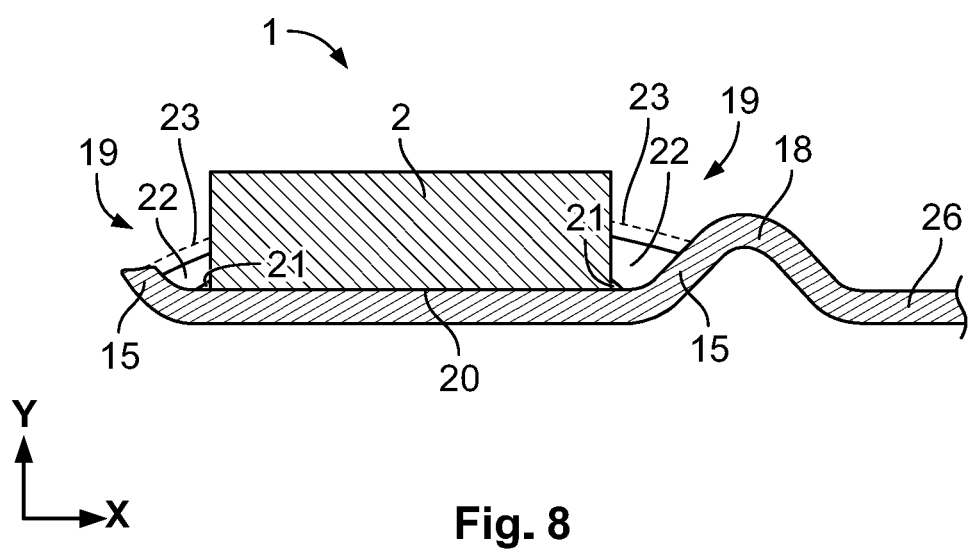
FIG. 8 is a sectional end view of the electrical connection of FIG. 3 after filling in a sealing material.
Figure 9:
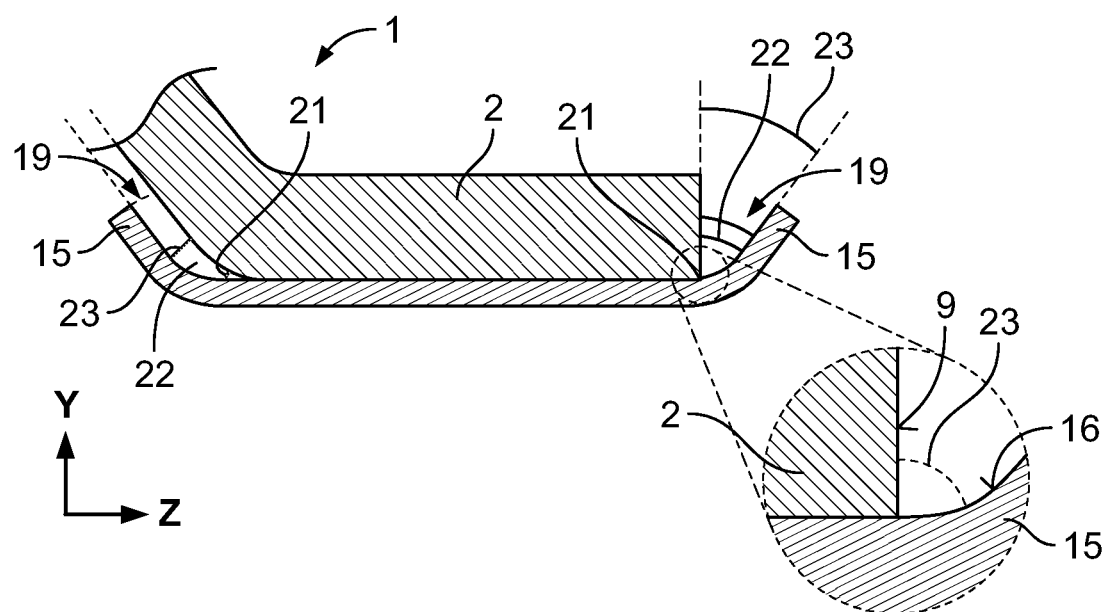
FIG. 9 is a sectional side view of the electrical connection of FIG. 3 after filling in the sealing material.

The sealing material 22 is shown filled in the reservoir space 19 in FIGS. 8 and 9. After filling in the sealing material 22 in the reservoir space 19 and forming a circumferential sealing ring, the sealing material 22 is cured to a circumferential tight sealing ring that seals the gap 21. In an embodiment, the reservoir space 19 has in a cross-section view a shape that narrows in direction to the second contact face 14; the opening of the reservoir space 19 is relatively wide. An opening angle 23 of a cross-section shape of the reservoir space 19 is about 45° or less. The smaller the opening angle 23, the less sealing material 22 is necessary to form a circumferential sealing ring. By using a fluid material, a small cross-section of the reservoir space 19 does not disturb the precise forming of the circumferential sealing ring adjacent to the ring gap 21 around the interface 20.

The rim 15 defines a predetermined volume and a predetermined thickness for the sealing material 22 to attain a sufficient sealing. The sealing material 22 can be filled up to an upper side of the rim 15. The seal formed by the sealing material 22 may be a dust tight sealing and/or a fluid tight sealing and/or a gas tight sealing to prevent dust, water and/or oxygen from reaching the contact area between the first contact face 3 and the second contact face 14, improving the long-term stability of the electrical contact between the first and the second contact face 3, 14.

A mechanical connection between the first and the second conductor 1, 12 is provided by the sealing ring which is arranged in a lateral direction between the first conductor 1 and the second conductor 12. The increased lateral mechanical fixing improves a long term stability of the sealing ring and reduces friction corrosion since the sealing ring reduces a relative lateral movement between the first conductor 1 and the second conductor 12. A stiff sealing material 22 arranged between the first and the second side face 7, 16 improves the mechanical fixing. The high mechanical stability is advantageous in applications in which where the electrical connection receives a lot of shocks or vibrations. For example, if the electrical connection is mounted in a car, then a robust mechanical fixing and a robust tight sealing is useful.

Figure 10:
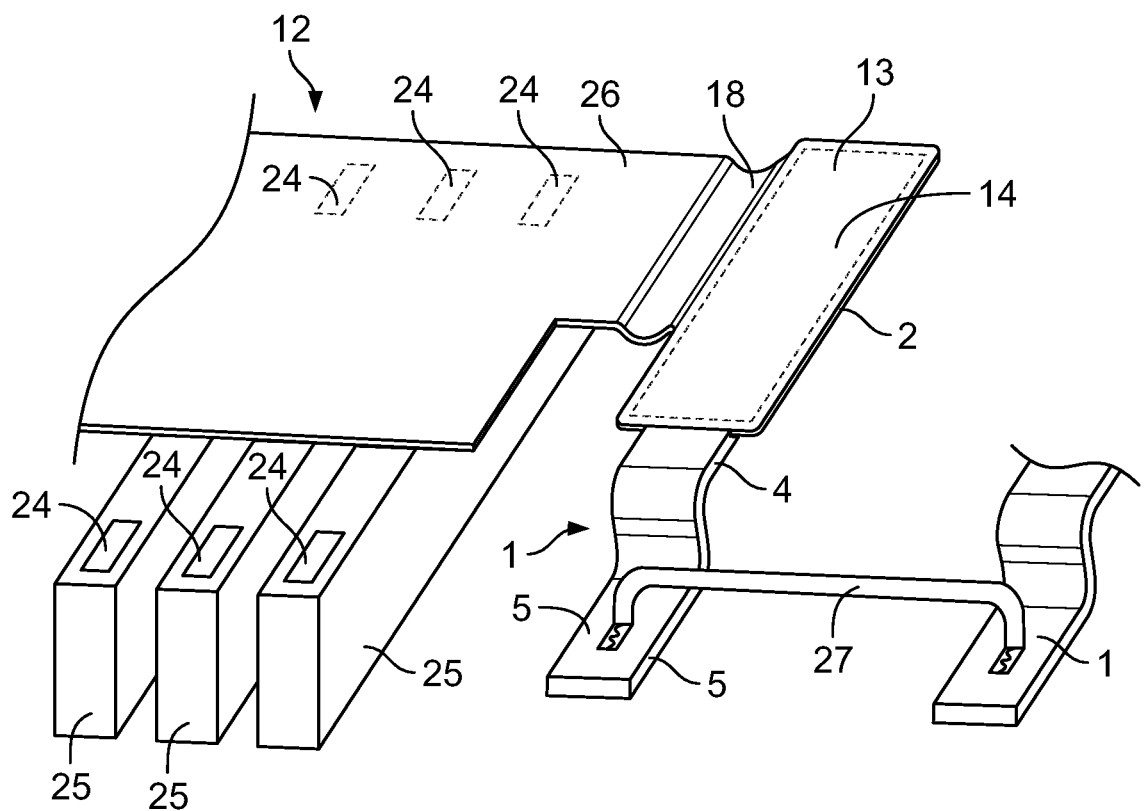
FIG. 10 is a perspective view of a battery with an electrical conductor system.

A battery with a plurality of battery cells 25 is shown connected via an electrical conductor system with a further battery in FIG. 10. In an embodiment, the battery may be used in a motor vehicle.

As shown in FIG. 10, the conductor system comprises a second conductor 12. The second conductor 12 is connected with electrical battery contacts 24 of several battery cells 25. The battery contacts 24 are connected with the second conductor section 26 of the second conductor 12. The second conductor section 26 is connected via the second bent section 18 with the second contact section 13. In another embodiment, the bent section 18 may be omitted.

The second contact section 13 is embodied as described above and, as shown in FIG. 10, has at a bottom the second contact face 14. The second contact face 14 is schematically depicted with a dotted line. The second contact face 14 is connected with the first contact face 3 of the first conductor 1. An interface between the first and the second contact face 3, 14 is sealed by a sealing ring as described above. The first conductor section 5 of the first conductor 1 can be electrically connected, for example, by an electrical line 27 with an electrical component or for example, with a further first conductor 1. The electrical line 27 may be embodied as a module connection which connects at least two batteries, wherein each battery may have at least one battery cell.

The further first conductor 1 can also be connected with a further second conductor 12 and with further battery cells 25. Therefore, a battery with an electrical conductor system is provided with at least one battery cell 25 which comprises an electrical connection with a first and a second conductor 1, 12 that are connected via first and second contact faces 3, 14, wherein the interface 20 between the first and second contact faces 3, 14 is sealed by the sealing ring. The second conductor 12 is a plate, for example, an aluminum plate. The first conductor 1 is a plate, for example, a busbar made of copper.

In an embodiment, the battery system may, for example, be arranged in a car. Especially for electrical connections in a car which experience a lot of shocks or vibrations during driving, a safe and secure connection between the first and the second conductor 1, 12 are highly valuable. The sealing ring not only protects the electrical interface between the first and the second contact face 3, 14 against environmental influences, for example humidity and oxygen, but the sealing material and the circumferential arrangement of the first contact face 3 within the contact space 17 and the lateral arrangement of the second side face 16 of the rim 15 improves the mechanical fixing in a lateral direction. In other embodiments, the proposed connection of the first and the second conductor 1, 12 are not limited to the application in a battery system but can also be used in any electrical connections.

What is claimed is:

1. An electrical connection, comprising:
a first conductor having a first contact section with a first contact face laterally delimited by a first side face; and
a second conductor electrically connected to the first conductor, each of the first conductor and the second conductor is made of an electrically conductive material, the second conductor has a second contact section with a second contact face surrounded by a rim having a second side face, the second side face limits a contact space above the second contact face and the first contact face is arranged on the second contact face, a reservoir space is arranged between the first side face of the first contact face and the second side face of the rim, the reservoir space surrounds the first contact face and a sealing material is arranged in the reservoir space, the reservoir space has a cross-section that narrows in a direction of the second contact face, the sealing material forms a sealing ring that seals an interface between the first contact face and the second contact face.

2. The electrical connection of claim 1, wherein the cross-section has an opening angle of about 45° or less.

3. The electrical connection of claim 1, wherein the first contact face and the second contact face are electrically and mechanically connected in the contact space by a welding layer.

4. The electrical connection of claim 1, wherein the first contact section extends above the contact space.

5. The electrical connection of claim 1, wherein the rim is formed by a stamping process.

6. The electrical connection of claim 1, wherein the first contact section is formed in a single piece with a first conductor section and connected with the first conductor section by a bent section.

7. The electrical connection of claim 6, wherein the bent section extends away from the first contact section and a surface of the bent section is a part of the first side face.

8. The electrical connection of claim 1, wherein the second contact section is formed in a single piece with a second conductor section and connected with the second conductor section by a second bent section.

9. The electrical connection of claim 8, wherein the second bent section extends away from the second contact section and forms a part of the second side face.

10. The electrical connection of claim 1, wherein the first conductor and the second conductor are made of different metal materials.

11. The electrical connection of claim 10, wherein the first conductor is formed of a copper material and the second conductor is formed of an aluminum material.

12. The electrical connection of claim 1, wherein the sealing material is an acrylic, a polyurethane, an epoxy resin, or a silicone.

13. A battery with an electrical conductor system, comprising:

an electrical connection including a first conductor having a first contact section with a first contact face laterally delimited by a first side face and a second conductor electrically connected to the first conductor, each of the first conductor and the second conductor is made of an electrically conductive material, the second conductor has a second contact section with a second contact face surrounded by a rim having a second side face, the second side face limits a contact space above the second contact face and the first contact face is arranged on the second contact face, a reservoir space is arranged between the first side face of the first contact face and the second side face of the rim, the reservoir space surrounds the first contact face and a sealing material is arranged in the reservoir space, the reservoir space has a cross-section that narrows in a direction of the second contact face, the sealing material forms a sealing ring that seals an interface between the first contact face and the second contact face.

14. The battery of claim 13, wherein the second conductor is connected with an electrical contact of the battery.

15. The battery of claim 14, wherein the first conductor is electrically connected via an electrical line with an electrical conductor system of a further battery.

16. The battery of claim 13, wherein the first contact face and the second contact face are electrically and mechanically connected in the contact space by a welding layer.

* * * * *